United States Patent
Kawasaki et al.

(10) Patent No.: US 7,457,055 B2
(45) Date of Patent: Nov. 25, 2008

(54) LENS DRIVING APPARATUS AND OPTICAL PICKUP UNIT HAVING THE SAME

(75) Inventors: Ryoichi Kawasaki, Gunma (JP); Hiroyuki Shindo, Tokyo (JP)

(73) Assignees: Sanyo Electric Co., Ltd., Osaka (JP); Sanyo Optec Design Co., Ltd., Tokyo (JP)

(*) Notice: Subject to any disclaimer, the term of this patent is extended or adjusted under 35 U.S.C. 154(b) by 9 days.

(21) Appl. No.: 11/683,839

(22) Filed: Mar. 8, 2007

(65) Prior Publication Data

US 2007/0223320 A1 Sep. 27, 2007

(30) Foreign Application Priority Data

Mar. 24, 2006 (JP) ............................. 2006-083562

(51) Int. Cl.
G02B 27/02 (2006.01)
G02B 7/02 (2006.01)
(52) U.S. Cl. ...................... 359/798; 359/823; 359/824
(58) Field of Classification Search ......... 359/694–704, 359/798–801, 819–824
See application file for complete search history.

(56) References Cited

U.S. PATENT DOCUMENTS 6,188,530 B1 * 2/2001 Katsuragi .................. 359/824
6,618,212 B2 * 9/2003 Chikami et al. ............ 359/699

FOREIGN PATENT DOCUMENTS

JP 2633066 4/1997
JP 2003-257069 9/2003

* cited by examiner

Primary Examiner—Mohammed Hasan
(74) Attorney, Agent, or Firm—Fish & Richardson P.C.

(57) ABSTRACT

A lens driving apparatus includes a first lens-barrel having a lens built thereinto; a second lens-barrel; an electromechanical conversion element that applies a driving force f1 to the first lens-barrel and a driving force f2 to the second lens-barrel; and a housing that supports the lateral surfaces of the first lens-barrel and the second lens-barrel such that a lens-barrel body is mounted slidably on the housing in the light axis direction of the lens, the lens barrel body being the first lens-barrel and the second lens-barrel connected via the electromechanical conversion element therebetween, wherein the electromechanical conversion element generates deformation which results in displacement in the light axis direction of the lens by applying a drive voltage.

9 Claims, 8 Drawing Sheets

LENS DRIVING APPARATUS AND OPTICAL PICKUP UNIT HAVING THE SAME

CROSS-REFERENCE TO RELATED APPLICATION

This application claims the benefit of priority to Japanese Patent Application No. 2006-83562, filed Mar. 24, 2006, of which full contents are incorporated herein by reference.

BACKGROUND OF THE INVENTION

1. Technical Field

The present invention relates to a lens driving apparatus that drives a lens-barrel body to both sides in the light axis direction of a lens, and an optical pickup unit disposed with this lens driving apparatus on a light path between a laser light source and an objective lens.

2. Description of the Related Art

With regard to a signal recording medium such as an optical disk used to optically reproduce or record signals with the use of laser light, the Blu-ray standard and the HD-DVD (High Density Digital Versatile Disk) standard are proposed which are new optical disk standards achieving recording densities higher than prevailing optical disk standards, i.e., DVD or CD.

An optical pickup unit corresponding to the optical disk standards achieving higher recording densities requires precise optical characteristics in association with the improved recording densities so as to enhance signal recording quality, and an optical pickup unit is known that is disposed with an aberration correction lens correcting spherical aberration generated by a light emitting optical system guiding laser light to a disk (see Japanese Patent Application Laid-Optical Publication No. 2003-257069).

The aberration correction lens includes a beam expander and a collimator lens, and spherical aberration is corrected in a condensed spot of the laser light which is irradiated to a signal layer through a cover layer (transparent substrate) covering the signal layer of the disk by allowing the aberration correction lens to be driven in the light axis direction to displace the aberration correction lens in the light axis direction.

By the way, in a lens driving apparatus that drives the lens in the light axis direction, a piezoelectric element is used as a driving source, and in a known technology, one end of the piezoelectric element is used as a fixed end; a driving bar is fixed to the other end of the piezoelectric element; a lens-barrel incorporation a lens is supported by the driving bar such that the lens-barrel can be slid and displaced relative to the driving bar; and the lens-barrel is driven in the light axis direction of a predetermined lens by expanding and contracting the piezoelectric element and by controlling the expanding and contracting speed of the piezoelectric element (see Japanese Published Patent No. 2633066).

By enabling the driving of the aberration correction lens with the use of such a lens driving apparatus, an optical pickup unit capable of correcting spherical aberration is provided.

By the way, the above lens driving apparatus includes a large number of components partially because a driving bar and a guide shaft are used to support the lens-barrel, and is is advantageous in miniaturization.

If a lens-barrel is slid by the driving bar and the guide shaft passing through the lens-barrel, the apparatus becomes susceptible to dust and normal movement may be disturbed, and also clearance is needed around the driving bar and the guide shaft to allow the sliding motion. However, when the lens-barrel is moved due to the clearance, the lens-barrel may tilt or misalignment of the light axis may be generated, resulting in a tilt of the lens or decentering of the lens, which is problematic.

SUMMARY OF THE INVENTION

To solve the above problems, a major aspect of the present invention provides a lens driving apparatus comprising: a first lens-barrel having a lens built thereinto; a second lens-barrel; an electromechanical conversion element that applies a driving force f1 to the first lens-barrel and a driving force f2 to the second lens-barrel; and a housing that supports the lateral surfaces of the first lens-barrel and the second lens-barrel such that a lens-barrel body is mounted slidably on the housing in the light axis direction of the lens, the lens barrel body being the first lens-barrel and the second lens-barrel connected via the electromechanical conversion element therebetween, wherein the electromechanical conversion element generates deformation which results in displacement in the light axis direction of the lens by applying a drive voltage, and wherein the first lens-barrel generates an inertia force IF1 and a friction force FF1 with the support surface of the housing by applying the driving force f1, and wherein the second lens-barrel generates an inertia force IF2 and a friction force FF2 with the support surface of the housing by applying the driving force f2, and wherein the lens-barrel body is driven to one side in the light axis direction of the lens, such that a relationship of f1<IF1+FF1 as well as f2>IF2+FF2 holds, when the electromechanical conversion element generates the deformation so as to increase an interval between the first lens-barrel and the second lens-barrel, and such that a relationship of f1>IF1+FF1 as well as f2<IF2+FF2 holds, when the electromechanical conversion element generates the deformation so as to reduce an interval between the first lens-barrel and the second lens-barrel, and wherein the lens-barrel body is driven to the other side in the light axis direction of the lens, such that a relationship of f1>IF1+FF1 as well as f2<IF2+FF2 holds, when the electromechanical conversion element generates the deformation so as to increase an interval between the first lens-barrel and the second lens-barrel, and such that a relationship of f1<IF1+FF1 as well as f2>IF2+FF2 holds, when the electromechanical conversion element generates the deformation so as to reduce an interval between the first lens-barrel and the second lens-barrel.

According to the present invention, the lens-barrel body can be driven to the both sides in the light axis direction of the lens relative to the support surface of the housing with a simple configuration of mounting on the housing the lens-barrel body formed by coupling the first lens-barrel to the second lens-barrel with the electromechanical conversion element therebetween. Especially since a guide shaft is not needed, tilt of the lens-barrel body and misalignment of the light axis are not generated and, therefore, tilt of the lens and decentering of the lens are not generated.

In this case, the lens-barrel body can be certainly moved in the light axis direction of the lens by disposing the lens-barrel body in the guide groove of the housing to slide the lens-barrel body along the guide groove and, especially, the lens-barrel body can be supported stably along two predetermined bus lines of the lens-barrel body on the wall surfaces of the guide groove by forming the guide groove with a substantially V-shaped cross section.

When setting a relationship of the mass of the first lens-barrel and the second lens barrel as well as a relationship of the maximum friction coefficients of the first lens-barrel and the second lens barrel, the mass of the first lens-barrel is set heavier than that of the second lens-barrel. Since the mass of the first lens-barrel is increased by the lens because the lens is built into the first lens-barrel and a metal material is often used as the material of the first lens-barrel to ensure accuracy, it is rational to set the mass of the first lens-barrel heavier than that of the second lens-barrel.

When setting the relationship of the maximum friction coefficients of the first lens-barrel and the second lens barrel, by processing the support surface of one or both of the first lens-barrel and the second lens-barrel supported by the housing in a correlated manner, the maximum friction coefficients can be adjusted with a simple process.

Since the material of the first lens-barrel is metal and the material of the second lens-barrel is plastic, the maximum friction coefficient of the first lens-barrel can be set larger than the maximum friction coefficients of the second lens-barrel by roughening of the lateral surface of the second lens-barrel 2 into a satin finished surface, etc.

Since an aberration correction lens an be driven by the lens driving apparatus advantageous in miniaturization in a simple configuration, an optical pickup unit is advantageously provided which can be miniaturized and correct spherical aberration and an optical pickup unit can be provided which has a high degree of freedom in the optical layout of the lens driving apparatus.

BRIEF DESCRIPTION OF THE DRAWINGS

To understand the present invention and the advantages thereof more thoroughly, the following description should be referenced in conjunction with the accompanying drawings.

DETAILED DESCRIPTION OF THE INVENTION

From the contents of the description and the accompanying drawings, at least the following details will become apparent.

FIRST EMBODIMENT

Figure 1:
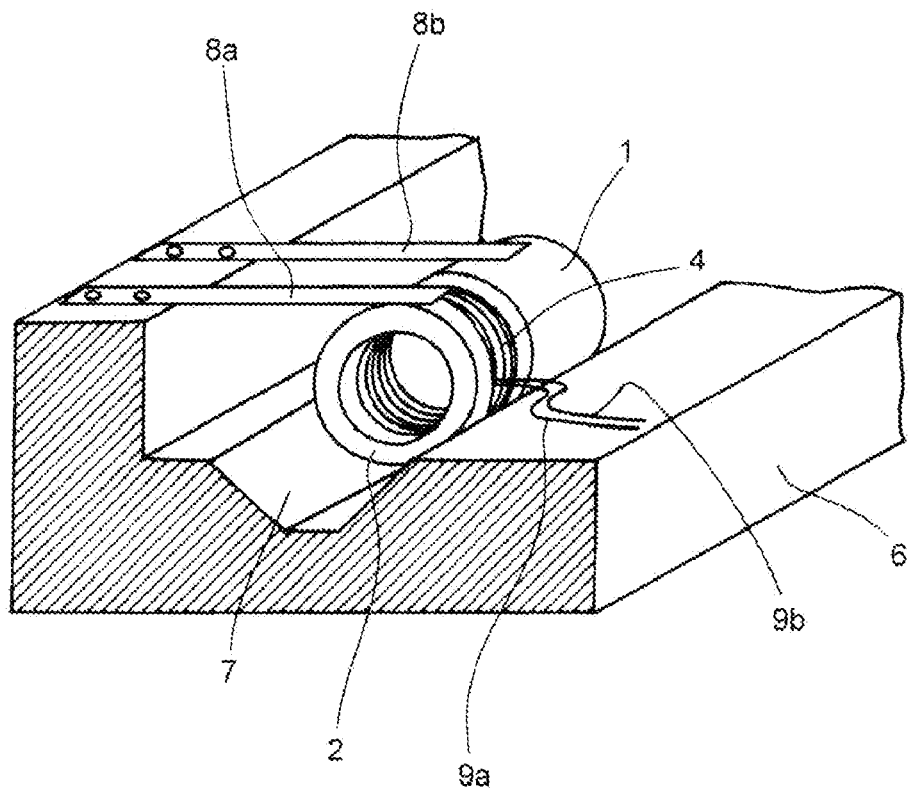
FIG. 1 is a perspective view of an embodiment of a lens driving apparatus according to the present invention.
Figure 2:
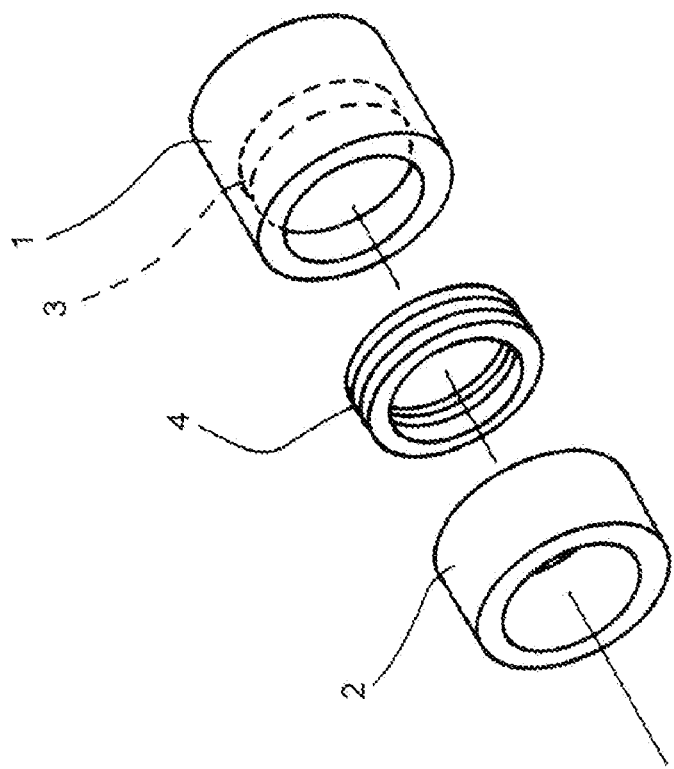
FIG. 2 is an exploded perspective view of a main portion of the lens driving apparatus of FIG. 1.

FIG. 1 is a perspective view of an embodiment of a lens driving apparatus according to the present invention and FIG. 2 is an exploded perspective view of a main portion of the lens driving apparatus of FIG. 1.

A first lens-barrel 1 is made of a metal material, for example, brass, in a cylindrical shape, and a lens 3 is built into the first lens-barrel 1. A second lens-barrel 2 is made of a plastic material, for example, PPS (polyphenylene sulfide), in a cylindrical shape.

A piezoelectric element 4 is a laminated type, is configured in a cylindrical shape to ensure a light path, and is an electromechanical conversion element displaced in the thickness direction by applying a voltage.

The first lens-barrel 1 and the second lens-barrel 2 are formed with the same diameter; the piezoelectric element 4 has a diameter slightly smaller than the first lens-barrel 1 and the second lens-barrel 2 so as not to contact with a housing 6; and the first lens-barrel 1 is connected to the second lens-barrel 2 with the piezoelectric element 4 therebetween to constitute a lens-barrel body 5. In the case, the first lens-barrel 1, and the second lens-barrel 2, and the piezoelectric element 4 are coupled in the light axis direction of the lens 3 by boding adjacent members with an adhesive agent such that the centers thereof are substantially matched.

The lens-barrel body 5 with this configuration is mounted to the housing 6 made of magnesium such that the lateral surfaces of the first lens-barrel 1 and the second lens-barrel 2 are placed on the housing 6. In the housing 6, a guide groove 7 is formed to guide the sliding direction of the lens-barrel body 5; the guide groove 7 is formed with a substantially V-shaped cross section; and the lens-barrel body 5 is supported on the wall surfaces of the V-shaped portion of the guide groove 7 along two predetermined bus lines of the lens-barrel body 5. Therefore, the lens-barrel body 5 is guided stably by the guide groove 7 and can slide in the light axis direction of the lens 3.

The lens-barrel body 5 is disposed on the wall surfaces of the V-shaped portion of the guide groove 7 by applying pressing forces to portions of the first lens-barrel 1 and the second lens-barrel 2 from two plate sprig members 8a and 8b fixed to the housing 6.

When a drive voltage is applied through leads wires 9a and 9b to the piezoelectric element 4 of the lens-barrel body 5 disposed on the housing 6 in this way, the piezoelectric element 4 is deformed in the thickness direction such that an interval between the first lens-barrel 1 and the second lens-barrel 2 is extended. Therefore, forces are applied to the first lens-barrel 1 and the second lens-barrel 2 in directions away from each other along the light axis direction of the lens 3.

On the other hand, when the application of the drive voltage is terminated in the piezoelectric element 4 of the lens-barrel body 5, the piezoelectric element 4 is deformed in the thickness direction by returning to the original thickness such that the interval between the first lens-barrel 1 and the second lens-barrel 2 is narrowed. Therefore, forces are applied to first lens-barrel 1 and the second lens-barrel 2 in directions moving closer to each other along the light axis direction of the lens 3.

By the way, when it is assumed that m1 and m2 are the mass of the first lens-barrel 1 including the lens 3 and the mass of the second lens-barrel 2, respectively, and when it is assumed that μ1 and μ2 are maximum friction coefficients when sliding the first lens-barrel 1 and the second lens-barrel 2 on the support surfaces supported by the housing 6, respectively, m1>m2 holds in the mass relationship between the first lens-barrel 1 and the second lens-barrel 2 due to the presence of the lens 3, the difference in the materials, and the difference in the amounts of the materials, etc., and μ1<μ2 holds in the maximum friction coefficient relationship between the first lens-barrel 1 and the second lens-barrel 2 due to the difference in the materials of the lens-barrels or the surface finishing of the support surfaces of the lens-barrels supported by the housing 6.

In the surface finishing of the support surfaces of the lens-barrels supported by the housing 6, the lateral surface of the first lens-barrel 1 is mirror-finished to make the support surface of the first lens-barrel 1 supported by the housing 6 smoother than the support surface of the second lens-barrel 2 supported by the housing 6, and/or the lateral surface of the second lens-barrel 2 is satin-finished or roughened to make the support surface of the second lens-barrel 2 supported by the housing 6 rougher than the support surface of the first lens-barrel 1 supported by the housing 6.

Figure 3:
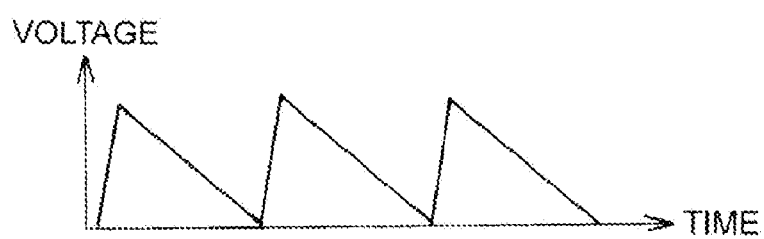
FIG. 3 is a waveform diagram of a drive voltage applied to a piezoelectric element 4 for one direction of a lens-barrel body 5.

Description will hereinafter be made of the movement of the lens-barrel body 5 if a drive voltage applied to the piezoelectric element 4 of the lens-barrel body 5 is a triangular wave signal rising rapidly and falling slowly as shown in FIG. 3 when the aforementioned mass relationship and maximum friction coefficient relationship hold between the first lens-barrel 1 and the second lens-barrel 2.

When the rising of the drive voltage deforms the piezoelectric element 4 from the state that the lens-barrel body 5 stands still on the support surface of the housing 6 without the application of the drive voltage to the piezoelectric element 4 as shown in FIG. 4(a), forces f1 and f2 are applied respectively to the first lens-barrel 1 and the second lens-barrel 2 in directions away from each other along the light axis direction of the lens 3 as shown in FIG. 4(b). An inertia force IF1 and an inertia force IF2 are generated in the first lens-barrel 1 and the second lens-barrel 2 respectively depending on the forces f1 and f2 which are applied to the first lens-barrel 1 and the second lens-barrel 2. The inertia force IF1 generated in the first lens-barrel 1 is a value obtained by multiplying the mass m1 of the first lens-barrel 1 by acceleration α generated in the first lens-barrel 1 and the second lens-barrel 2 due to the deformation of the piezoelectric element 4, i.e., IF1=m1×α, and on the other hand, the inertia force IF2 generated in the second lens-barrel 2 is a value obtained by multiplying the mass m2 of the second lens-barrel 2 by acceleration α generated in the first lens-barrel 1 and the second lens-barrel 2 due to the deformation of the piezoelectric element 4, i.e., IF2=m2×α. The forces f1 and f2 applied respectively to the first lens-barrel 1 and the second lens-barrel 2 are associated with the deformation of the piezoelectric element 4 and are equivalent to each other.

When the forces f1 and f2 are applied respectively to the first lens-barrel 1 and the second lens-barrel 2, a friction force FF1 and a friction force FF2 are generated in the first lens-barrel 1 and the second lens-barrel 2 depending on the forces. The friction force FF1 generated in the first lens-barrel 1 is a value obtained by multiplying the mass m1 of the first lens-barrel 1 by the maximum friction coefficient μ1 and gravitational acceleration g of the first lens-barrel 1, i.e., FF1=m1×μ1×g, and on the other hand, the friction force FF2 generated in the second lens-barrel 2 is a value obtained by multiplying the mass m2 of the second lens-barrel 2 by the maximum friction coefficient μ2 and gravitational acceleration g of the second lens-barrel 2, i.e., FF2=m2×μ2×g.

In this case, the inertia force IF1 and the friction force FF1 of the first lens-barrel 1 act in the opposite direction of the force f1 applied to the first lens-barrel 1 due to the deformation of the piezoelectric element 4 and the inertia force IF2 and the friction force FF2 of the second lens-barrel 2 act in the opposite direction of the force f2 applied to the second lens-barrel 2 due to the deformation of the piezoelectric element 4. That is, a resultant force of the inertia force IF1 and the friction force FF1 is generated in the first lens-barrel 1 and a resultant force of the inertia force IF2 and the friction force FF2 is generated in the second lens-barrel 2, depending on the deformation of the piezoelectric element 4.

By the way, at the time of the rising of the drive voltage when the drive voltage of the piezoelectric element 4 rises steeply, the acceleration α generated in the first lens-barrel 1 and the second lens-barrel 2 becomes large, and the inertia forces IF1 and IF2 generated in the first lens-barrel 1 and the second lens-barrel 2 become dominated as compared to the friction forces FF1 and FF2 generated in the first lens-barrel 1 and the second lens-barrel 2. At the time of the rising of the drive voltage, the resultant force of the inertia force IF1 and the friction force FF1 generated in the first lens-barrel 1 is designed to become larger than the force f1 applied to the first lens-barrel 1 due to the deformation of the piezoelectric element 4, and the resultant force of the inertia force IF2 and the friction force FF2 generated in the second lens-barrel 2 is designed to become smaller than the force f2 applied to the second lens-barrel 2 due to the deformation of the piezoelectric element 4. That is, a relationship of f1<IF1+FF1 as well as f2>IF2+FF2 holds and, therefore, if the piezoelectric element 4 is deformed to increase the thickness at the time of the rising of the drive voltage, the first lens-barrel 1 is not displaced while the second lens-barrel 2 is displaced as shown in FIG. 4(b).

On the other hand, at the time of the falling of the drive voltage when the drive voltage of the piezoelectric element 4 falls slowly, the acceleration α generated in the first lens-barrel 1 and the second lens-barrel 2 approaches zero, and the friction forces FF1 and FF2 generated in the first lens-barrel 1 and the second lens-barrel 2 become dominant as compared to the inertia forces IF1 and IF2 generated in the first lens-barrel 1 and the second lens-barrel 2. At the time of the falling of the drive voltage, the resultant force of the inertia force IF1 and the friction force FF1 generated in the first lens-barrel 1 is designed to become smaller than the force f1 applied to the first lens-barrel 1 due to the deformation of the piezoelectric element 4, and the resultant force of the inertia force IF2 and the friction force FF2 generated in the second lens-barrel 2 is designed to become larger than the force f2 applied to the second lens-barrel 2 due to the deformation of the piezoelectric element 4. That is, a relationship of f1>IF1+FF1 as well as f2<IF2+FF2 holds and, therefore, if the piezoelectric element 4 is deformed and returned to the original state free from the deformation at the time of the falling of the drive voltage, the second lens-barrel 2 is not displaced while the first lens-barrel 1 is displaced as shown in FIG. 4(i c).

Figure 4:
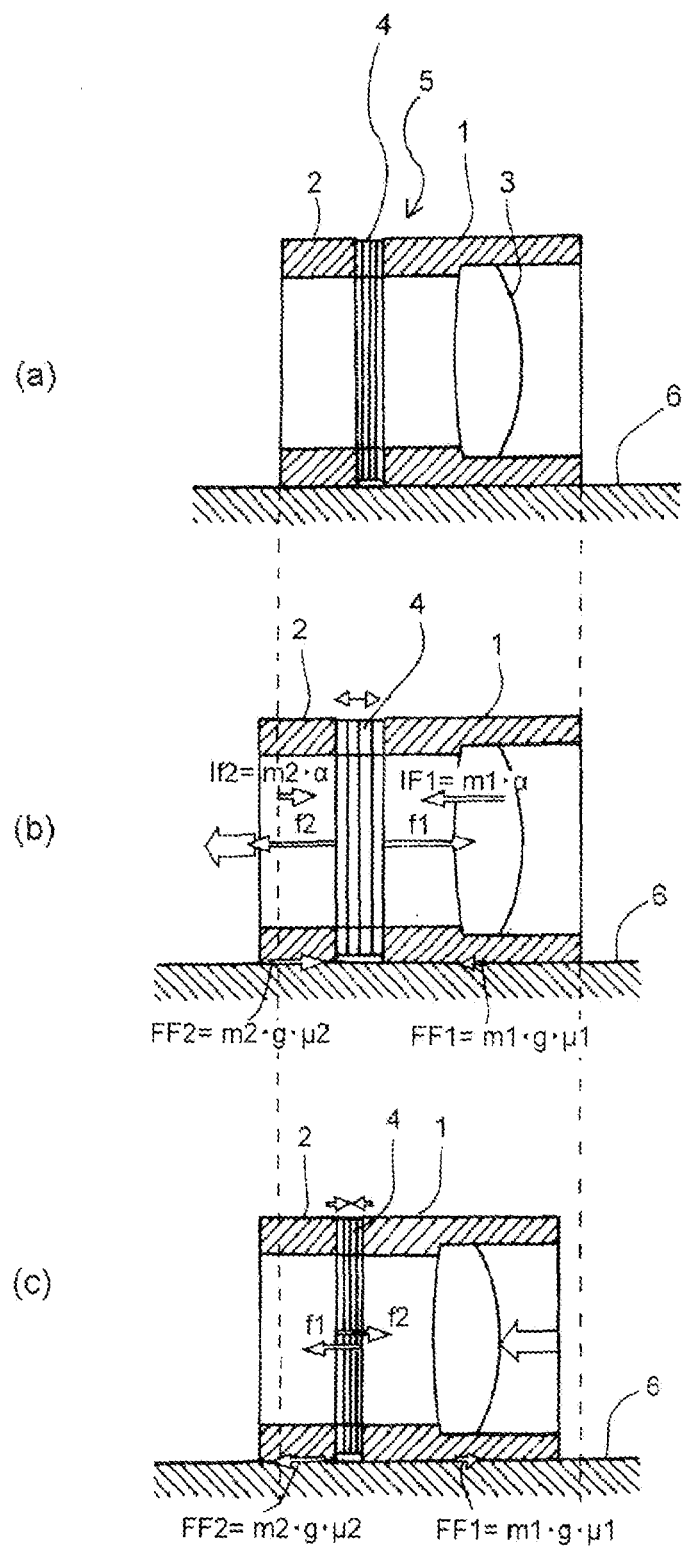
FIG. 4 is cross-section diagrams describing movement of the lens-barrel body 5 when the drive voltage shown in FIG. 3 is applied to the piezoelectric element 4.

Therefore, by applying to the piezoelectric element 4 the drive voltage of a triangular wave signal rising rapidly and falling slowly as shown in FIG. 3, the lens-barrel body 5 is guided by the guide groove 7 and driven to slide in the housing 6 in one light axis direction of the lens 3 to the left side of FIG. 4.

The resultant force of the inertia force IF1 and the friction force FF1 generated in the first lens-barrel 1 and the resultant force of the inertia force IF2 and the friction force FF2 generated in the second lens-barrel 2 are set by the mass m1 and m2 and the maximum friction coefficients μ1 and μ2 of the first lens-barrel 1 and the second lens-barrel 2 as well as the rising and falling rates of the drive voltage of the piezoelectric element 4, which adjust the acceleration α generated in the first lens-barrel 1 and the second lens-barrel 2.

Figure 5:
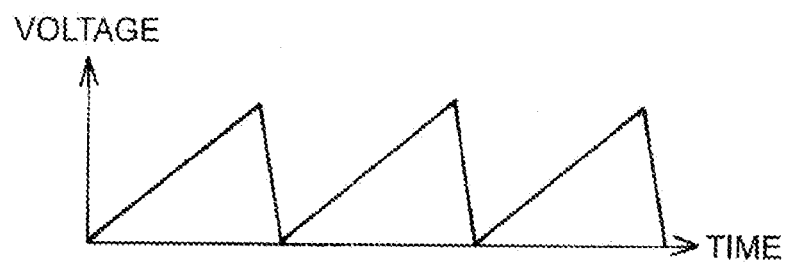
FIG. 5 is a waveform diagram of a drive voltage applied to the piezoelectric element 4 for the other direction of the lens-barrel body 5.

Description will hereinafter be made of the movement of the lens-barrel body 5 if a drive voltage applied to the piezoelectric element 4 of the lens-barrel body 5 is a triangular wave signal rising slowly and falling rapidly as shown in FIG. 5.

When the rising of the drive voltage deforms the piezoelectric element 4 from the state that the lens-barrel body 5 stands still on the support surface of the housing 6 without the application of the drive voltage to the piezoelectric element 4 as shown in FIG. 6(a), the forces f1 and f2 are applied to the first lens-barrel 1 and the second lens-barrel 2 in directions away from each other along the light axis direction of the lens 3; a resultant force of the inertia force IF1 and the friction force FF1 is generated in the first lens-barrel 1; and a resultant force of the inertia force IF2 and the friction force FF2 is generated in the second lens-barrel 2 as described in FIG. 4.

At the time of the rising of the drive voltage when the drive voltage of the piezoelectric element 4 rises slowly as shown in FIG. 5, the acceleration α generated in the first lens-barrel 1 and the second lens-barrel 2 approaches zero, and the friction forces FF1 and FF2 generated in the first lens-barrel 1 and the second lens-barrel 2 become dominant as compared to the inertia forces IF1 and IF2 generated in the first lens-barrel 1 and the second lens-barrel 2. At the time of the rising of the drive voltage, the resultant force of the inertia force IF1 and the friction force FF1 generated in the first lens-barrel 1 is designed to become smaller than the force f1 applied to the first lens-barrel 1 due to the deformation of the piezoelectric element 4, and the resultant force of the inertia force IF2 and the friction force FF2 generated in the second lens-barrel 2 is designed to become larger than the force f2 applied to the second lens-barrel 2 due to the deformation of the piezoelectric element 4. That is, a relationship of f1>IF1+FF1 as well as f2<IF2+FF2 holds and, therefore, if the piezoelectric element 4 is deformed to increase the thickness at the time of the rising of the drive voltage, and the lens-barrel 2 is not displaced while the first lens-barrel 1 is displaced as shown in FIG. 6(b).

On the other hand, at the time of the falling of the drive voltage when the drive voltage of the piezoelectric element 4 falls steeply, the acceleration α generated in the first lens-barrel 1 and the second lens-barrel 2 becomes large, and the inertia forces IF2 and IF2 generated in the first lens-barrel 1 and the second lens-barrel 2 become dominant as compared to the friction forces FF1 and FF2 generated in the first lens-barrel 1 and the second lens-barrel 2. At the time of the falling of the drive voltage, the resultant force of the inertia force IF1 and the friction force FF1 generated in the first lens-barrel 1 is designed to become larger than the force f1 applied to the first lens-barrel 1 due to the deformation of the piezoelectric element 4, and the resultant force of the inertia force IF2 and the friction force FF2 generated in the second lens-barrel 2 is designed to become smaller than the force f2 applied to the second lens-barrel 2 due to the deformation of the piezoelectric element 4. That is, a relationship of f1<IF1+FF1 as well as f2>IF2+FF2 holds and, therefore, if the piezoelectric element 4 is deformed and returned to the original state free from the deformation at the time of the falling of the drive voltage, the first lens-barrel 1 is not displaced while the second lens-barrel 2 is displaced as shown in FIG. 6(c).

Figure 6:
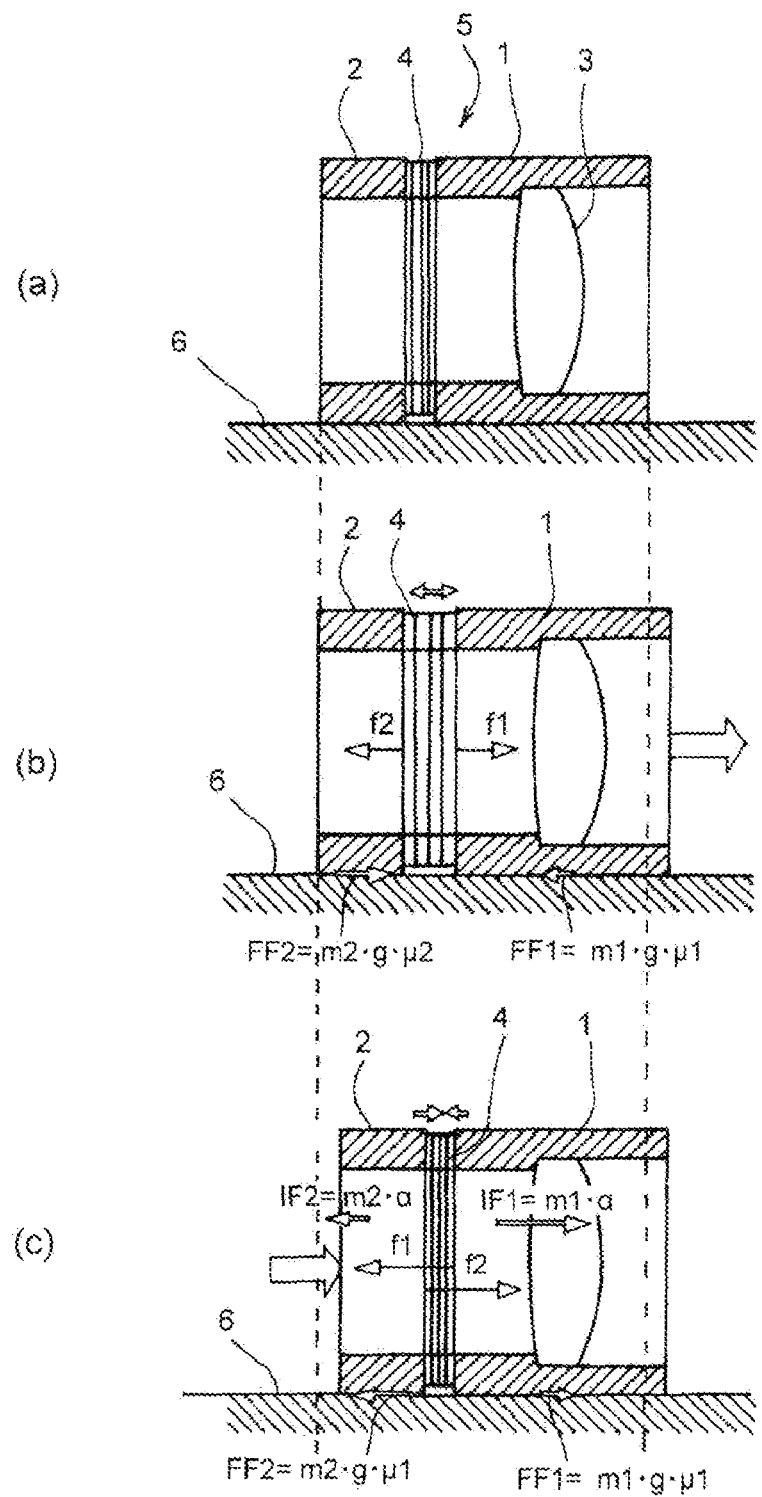
FIG. 6 is cross-section diagrams describing movement of the lens-barrel body 5 when the drive voltage shown in FIG. 5 is applied to the piezoelectric element 4.

Therefore, by applying to the piezoelectric element 4 the drive voltage of a triangular wave signal rising slowly and falling rapidly as shown in FIG. 5, the lens-barrel body 5 is guided by the guide groove 7 and driven to slide in the housing 6 in the other light axis direction of the lens 3 to the right side of FIG. 6.

Therefore, by applying to the piezoelectric element 4 the drive voltage of a triangular wave signal rising rapidly and falling slowly as shown in FIG. 3 or the drive voltage of a triangular wave signal rising slowly and falling rapidly as shown in FIG. 5, the lens-barrel body 5 can be driven in a predetermined direction of the light axis direction of the lens 3 and can be driven by a desired displacement amount by controlling the period of the application of the drive voltage to the piezoelectric element 4.

Although the electromechanical conversion element is the piezoelectric element 4 formed in a cylindrical shape by laminating ring-shape objects and is displaced in the thickness direction by applying the drive voltage to the piezoelectric element 4 in the embodiment described above, the electromechanical conversion element of the present invention is not limited to this embodiment and various aspects and modifications can be achieved without departing from the spirit of the invention.

Figure 7:
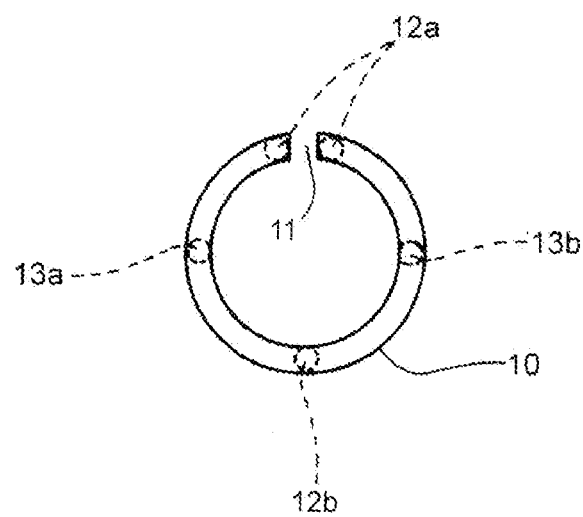
FIG. 7 is an explanatory diagram of a C-ring shaped bimorph element 8 that is an electromechanical conversion element.
Figure 8:
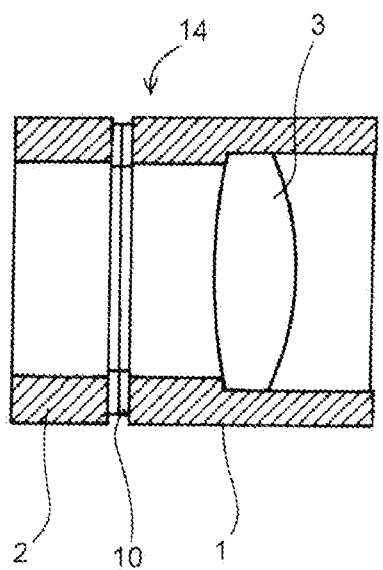
FIG. 8 is a cross-section diagram of a lens-barrel body 13 using the bimorph element 8.
Figure 9:
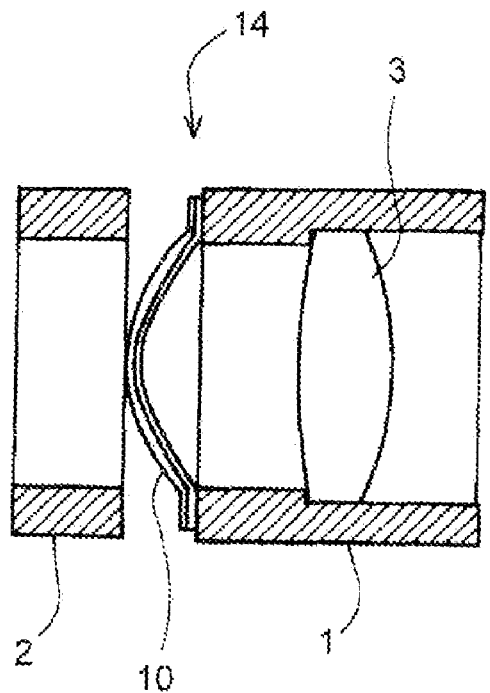
FIG. 9 is a cross-section diagram describing the movement of the lens-barrel body 5 shown in FIG. 8.

For example, the electromechanical conversion element may be a C-ring shaped bimorph element 10 with a cut 11 shown in FIG. 7. The bimorph element 10 is bonded to the first lens-barrel 1 at bonding areas 12a, 12b located on a predetermined diameter line and is bonded to the second lens-barrel 2 at bonding areas 13a, 13b located on a predetermined diameter line and, as shown in FIG. 8, the first lens-barrel 1 is coupled to the second lens-barrel 2 with the bimorph element 10 therebetween to constitute a lens-barrel body 14. The bimorph element 10 is deformed in a warped manner as shown in FIG. 9 depending on the application of the drive voltage and this drives the lens-barrel body 14.

Although the lens 3 is built into only the first lens-barrel 1 in the embodiment described above, this is not a limitation. If a combined lens is needed for an optical system of the lens-barrel body 5, although all the lenses may be built into the first lens-barrel 1, lenses may be built into both the first lens-barrel 1 and the second lens-barrel.

SECOND EMBODIMENT

Figure 10:
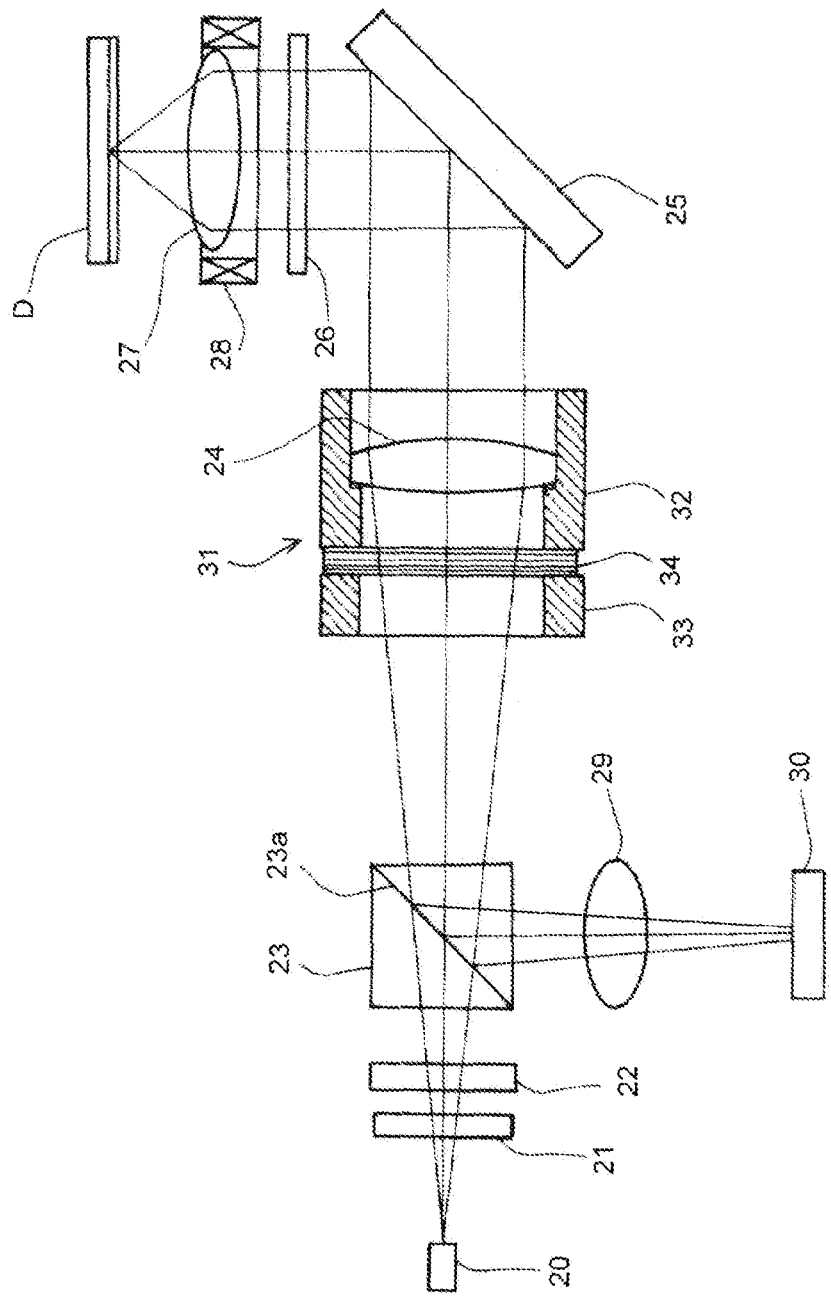
FIG. 10 is an optical layout view of an example of an optical pickup unit including the lens driving apparatus described in the first embodiment.

FIG. 10 is an optical layout view of an example of an optical pickup unit including the lens driving apparatus described in the first embodiment. The optical pickup unit shown in FIG. 10 has a configuration supporting a Blu-ray standard disk.

A laser diode 20 emits laser light having a wavelength from 400 nm to 420 nm, for example, 405 nm, which is in a blue-violet (blue) waveband suitable for the Blu-ray standard disk.

The laser light emitted from the laser diode 20 is diffracted by a diffraction grating 21 to form ±primary diffracted light used for the tracking control and, after the polarizing direction is set to p-polarization by a ½ wavelength plate 22, the laser light passes through a filter surface 23a of a prism-type polarizing beam splitter 23.

After passing through the polarizing filter surface 23a of the polarizing beam splitter 23, the laser light is converted to parallel light by collimator lens 24, is reflected by a reflection mirror 25 such that the light axis is bent orthogonally, passes through a ¼ wavelength plate 26, and is made incident on an objective lens 27.

The objective lens 27 has a numerical aperture 0.85 adapted to the Blu-ray standard. The objective lens 27 can be driven by an objective lens actuator 28 in the focus direction, the tracking direction, and the radial tilt direction, and the laser light condensed by the objective lens 27 follows and focuses on a signal layer of a disk D to follow a signal track of the signal layer and follows a tilt in the radial direction so as not to generate coma aberration in the light spot on the signal layer.

The laser light is modulated and reflected by the signal on the signal layer of the disk D, is returned to the objective lens 27, goes back the light path, and arrives at the polarizing beam splitter 23. Since the laser light returned to the polarizing beam splitter 23 passes through the ¼ wavelength plate 26 twice on the forward route to and the backward route from disk D, the polarizing direction is rotated by a ½ wavelength in the laser light returned to the polarizing beam splitter 23. Therefore, although the laser light is p-polarization on the forward route to the disk D, the laser light becomes s-polarization and is made incident on the polarizing beam splitter 23.

Therefore, the laser light returned to the polarizing beam splitter 23 is reflected by the polarizing filter surface 23a to generate a focus error component of the laser light irradiated to the disk D, is guided to a photodetector 30 through a servo lens 29 performing focus adjustment, and is received by receiving areas on the photodetector 30.

Therefore, the recording signal of the disk is acquired by the photodetector 30 through various received signals, and control signals are acquired for the focus control, the tracking control, and the radial tilt control corresponding to the disk.

By the way, the collimator lens 24 is built into the a lens-barrel body 31 of the lens driving apparatus described in the first embodiment, and the lens-barrel body 31 can be driven by a piezoelectric element 34 that is an aberration correction actuator intervening between the first lens-barrel 32 and the second lens-barrel 33 to coupling the lens-barrels 32 and 33. By applying a drive voltage to this piezoelectric element 34 to deform the piezoelectric element 34, the lens-barrel body 31 can be displaced to both sides by a predetermined amount in the light axis direction of the collimator lens 24 within the housing disposed with optical elements other than the objective lens. Therefore, by driving the lens-barrel body 31 to displace the collimator lens 24, a widening angle is adjusted in the laser light made incident on the objective lens 27. As a result, spherical aberration is generated for correction in the laser light emitted from the objective lens 24 to minimize the spherical aberration generated in the laser light converged on the signal layer through the cover layer (transparent substrate) covering the signal layer of the disk D.

The collimator lens 24 acts as an aberration correction lens that corrects spherical aberration generated in the laser light converged on the signal layer of the signal recording medium.

The lens driving apparatus of the present invention and the optical pickup unit including the lens driving apparatus is not limited to the shown apparatuses. The present invention can be modified variously without departing from the gist thereof.

What is claimed is:

1. A lens driving apparatus comprising:
a first lens-barrel having a lens built thereinto;
a second lens-barrel;
an electromechanical conversion element that applies a driving force f1 to the first lens-barrel and a driving force f2 to the second lens-barrel; and
a housing that supports the lateral surfaces of the first lens-barrel and the second lens-barrel such that a lens-barrel body is mounted slidably on the housing in the light axis direction of the lens, the lens barrel body being the first lens-barrel and the second lens-barrel connected via the electromechanical conversion element therebetween, wherein
the electromechanical conversion element generates deformation which results in displacement in the light axis direction of the lens by applying a drive voltage, and wherein
the first lens-barrel generates an inertia force IF1 and a friction force FF1 with the support surface of the housing by applying the driving force f1, and wherein
the second lens-barrel generates an inertia force IF2 and a friction force FF2 with the support surface of the housing by applying the driving force f2, and wherein
the lens-barrel body is driven to one side in the light axis direction of the lens,
such that a relationship of f1<IF1+FF1 as well as f2>IF2+FF2 holds, when the electromechanical conversion element generates the deformation so as to increase an interval between the first lens-barrel and the second lens-barrel, and
such that a relationship of f1>IF1+FF1 as well as f2<IF2+FF2 holds, when the electromechanical conversion element generates the deformation so as to reduce an interval between the first lens-barrel and the second lens-barrel, and wherein
the lens-barrel body is driven to the other side in the light axis direction of the lens,
such that a relationship of f1>IF1+FF1 as well as f2<IF2+FF2 holds, when the electromechanical conversion element generates the deformation so as to increase an interval between the first lens-barrel and the second lens-barrel, and
such that a relationship of f1<IF1+FF1 as well as f2>IF2+FF2 holds, when the electromechanical conversion element generates the deformation so as to reduce an interval between the first lens-barrel and the second lens-barrel.

2. The lens driving apparatus of claim 1, wherein the electromechanical conversion element is a piezoelectric element to be expanded and contracted in the thickness direction along the light axis direction of the lens by applying the drive voltage.

3. The lens driving apparatus of claim 1, wherein a guide groove is formed to dispose the lens-barrel body in the housing and to support the lens-barrel body slidably along the guide groove.

4. The lens driving apparatus of claim 3, wherein the guide groove is formed with a substantially V-shaped cross section to support the lens-barrel body along two predetermined bus lines of the lens-barrel body on the wall surfaces of the guide groove.

5. The lens driving apparatus of claim 1, wherein when it is assumed that
m1 and m2 are the mass of the first lens-barrel including the lens and the mass of the second lens-barrel, respectively, and that
$\mu 1$ and $\mu 2$ are maximum friction coefficients when the first lens-barrel and the second lens-barrel sliding on the support surfaces supported by the housing, respectively,
a relationship of m1>m2 as well as $\mu 1 < \mu 2$ holds.

6. The lens driving apparatus of claim 5, wherein the support surface of the first lens-barrel supported by the housing is finished smoother than the support surface of the second lens-barrel supported by the housing.

7. The lens driving apparatus of claim 5, wherein the support surface of the second lens-barrel supported by the housing is finished rougher than the support surface of the first lens-barrel supported by the housing.

8. The lens driving apparatus of claim 5, wherein the material of the first lens-barrel is metal and the material of the second lens-barrel is plastic.

9. An optical pickup unit, wherein
the lens driving apparatus of claim 1 is disposed on a light path between a laser light source and an objective lens, and wherein
the lens built into the first lens-barrel of the lens driving apparatus is an aberration correction lens that corrects spherical aberration generated by a light emitting optical system which guides laser light to a signal recording medium, and wherein
the spherical aberration of a condensed spot of the laser light which is irradiated on a signal layer of the signal recording medium, is corrected displacing the aberration correction lens in the light axis direction by driving the lens-barrel body.

* * * * *